(12) United States Patent
Boussoukaia et al.

(10) Patent No.: US 7,933,585 B2
(45) Date of Patent: Apr. 26, 2011

(54) MANAGING DOWNLOADING IN PORTABLE COMMUNICATING OBJECTS FOR A SINGLE-UNIT OPERATION DURING A CAMPAIGN

(75) Inventors: Nadir Boussoukaia, Marseilles (FR);
Frederic Martinent, Marseilles (FR);
Laurent Loubaud, Meyreuil (FR);
Guillaume Pascal, La Ciotat (FR)

(73) Assignee: Gemalto SA, Meudon (FR)

( * ) Notice: Subject to any disclaimer, the term of this patent is extended or adjusted under 35 U.S.C. 154(b) by 865 days.

(21) Appl. No.: 11/663,765

(22) PCT Filed: Jul. 28, 2005

(86) PCT No.: PCT/EP2005/053697
§ 371 (c)(1),
(2), (4) Date: Oct. 12, 2007

(87) PCT Pub. No.: WO2006/034903
PCT Pub. Date: Apr. 6, 2006

(65) Prior Publication Data
US 2008/0058015 A1    Mar. 6, 2008

(30) Foreign Application Priority Data

Sep. 27, 2004 (FR) .................................. 04 10226

(51) Int. Cl.
*H04W 1/725* (2006.01)
(52) U.S. Cl. .............. 455/412.1; 455/418; 455/411; 455/240; 455/436
(58) Field of Classification Search .............. 455/418, 455/240, 419, 411, 436, 435.1, 466, 502
See application file for complete search history.

(56) References Cited

U.S. PATENT DOCUMENTS

| 2004/0018831 | A1 | 1/2004 | Majmundar et al. |
| 2004/0076131 | A1 | 4/2004 | Qu et al. |
| 2005/0033829 | A1* | 2/2005 | Oommen ............... 709/220 |
| 2005/0083929 | A1* | 4/2005 | Salo et al. ............. 370/389 |

OTHER PUBLICATIONS

International Search Report dated Nov. 17, 2005.

* cited by examiner

*Primary Examiner* — Charles N Appiah
*Assistant Examiner* — Kwasi Karikari
(74) *Attorney, Agent, or Firm* — Buchanan, Ingersoll & Rooney

(57) ABSTRACT

The invention solves the problem of systematic image marking of portable communicating objects, such as smart cards or mobile terminals, involved in a campaign in a database connected to a downloading server, thereby releasing the server. Access to a communicating object targeted by the campaign is authorized for a single-unit operation while the server manages the preprocessing of data for the communicating object during the campaign. Access is inhibited for a single-unit operation concerning an object targeted by the campaign when access is requested while the server manages transmission of a data message to the communicating object during the campaign. Access is also prohibited while the server manages an acknowledgement transmitted by the communicating object and the post-processing of data concerning the communicating object.

13 Claims, 4 Drawing Sheets

MANAGING DOWNLOADING IN PORTABLE COMMUNICATING OBJECTS FOR A SINGLE-UNIT OPERATION DURING A CAMPAIGN

The present invention concerns the downloading of data from a server in portable communicating objects via a radio communication network. In particular, the communicating objects are smart cards, such as SIM (Subscriber Identity Module) cards, introduced in the mobile terminals of the radio communication network.

The data downloading server, also known as an OTA (Over The Air) card administration platform, includes software which allows the operator managing the radio communication network to maintain control of the smart cards in the mobile terminals and to modify their content. Said operations on the initiative of the operator (push mode) concern for example the downloading of a file in predetermined cards of the fleet managed by the operator, or the downloading or erasing of a predetermined application, or even the modification of data of a file or of a predetermined application in the cards managed by the operator.

The data to be downloaded in the smart cards are often transmitted via a short message service centre. A plurality of short messages is very often necessary for downloading an application or a file.

The invention is more specifically interested with the management of a downloading campaign for massively updating user cards by the OTA data downloading server which must also be able to operate single-unit downloads in the user cards either at the request of the operator who manages the cards, or at the request of users owning the cards, disrupting as little as possible a campaign.

According to a first example, a single-unit download concerns a single personnel file which is intended for roaming subscribers finding themselves frequently abroad and which contains more than around ten preferred network identifiers managed by operators with which the operator of the network managing the cards has contracted. The file of preferred network identifiers is unique and is designed to be downloaded in a number of predetermined user cards so that the users of said cards can use them when they will go abroad.

For said first example, the operator currently has two possibilities for downloading said file from the OTA server. According to a first possibility, the operator decides to download the file once, as and when, the first time that an interested user is roaming, and so on for all of the users one after the other, who are roaming. According to a second possibility, known as in campaign mode, the server sends the file of preferred network identifiers during a single campaign to the cards the users of which have subscribed to a roaming option.

In campaign mode the number of targeted users may reach a plurality of hundreds of thousands or millions.

According to a second example, a single-unit download concerns a single file of names and telephone numbers of salespeople of a company to be downloaded in the cards of the users employed by the company.

According to a third example, a single-unit download concerns an application facilitating the management of the directory of telephone numbers in the SIM cards. Said application allows a user to backup his entire directory in a predetermined server managed by the operator each time that the user records a new telephone number in his card.

According to said third example, three possibilities are offered. Following an advertisement shown on the television, the user calls during the day the call centre of the operator to request downloading the application in his SIM card. Said operation is a single-unit operation launched in the OTA server by the operator in "Customer Care" mode. According to a second possibility, the user takes the initiative to order downloads (pull mode) by consulting himself from his mobile terminal the site of the operator so as to launch the downloading of the application in the SIM card. Said downloading is also a single-unit operation ordered in the OTA server by the user in a mode known as "Self Care". According to a third possibility, the operator launches a downloading operation in campaign mode on more than one million targeted users so that the OTA server administers downloading of the application in the million of SIM cards.

A single-unit operation to be performed in a card at the request of the user of the card or of the operator is carried out by one of the single-unit modules included in the OTA server.

In FIG. 1 appended, a single-unit operation carried out by a single-unit module is shown by a block and consists of three elementary processings for downloading via a short message predetermined data in a user smart card Cn among N smart cards C1 to CN in mobile terminals from the OTA downloading server, with the index n such as $1 \leq n \leq N$. A first elementary processing PRET concerns a preprocessing of data to be formatted into a data message to be transmitted to the smart card Cn. The second elementary processing E/R extends from the transmission of the data message formatted by the server until the reception of the acknowledgement transmitted by the smart card Cn in the server. The first elementary processing is a post-processing POST during which the server analyses the acknowledgement received and stores possible data contained in the acknowledgement in order to record them corresponding with a number of the smart card Cn in a database connected to the server.

Access to the card Cn is inhibited ("locked") to the other single-unit modules and to the campaign modules that may request other operations in the card Cn, immediately by the single-unit module just before the single-unit operation in the card Cn begins, i.e. from the beginning of the preprocessing until the end of the post-processing concerning the operation. For inhibiting the access, the single-unit module places an access indicator (lock) in an access inhibition state in a table of the database of the server associated with the card Cn in order to inhibit access to the latter by all of the other single-unit modules and the campaign modules which may be able to read the state of the access indicator whilst the single-unit operation decided in the card Cn is not finished. If two single-unit modules simultaneously request accessing the card Cn, only one of them carries out its operation on the card Cn and either refuses the carrying out of the operation by the other single-unit module, or only authorises said carrying out of operation after having released ("unlocked") the card Cn by placing the access indicator in an access authorisation state. The following single-unit module which has requested an operation in the card Cn monitors the release of the card Cn. Noting the change of the state of the access indicator associated with the card Cn, it accesses the card Cn in order to carry out its operation.

According to the campaign mode, one of the campaign modules included in the server transmits the file of network identifiers during a single campaign to N smart cards C1 to CN the users of which have subscribed to a roaming option. In campaign mode, the number of targeted users is very high and may reach a plurality of hundreds of thousands or millions.

At the beginning of the campaign, the campaign module places N access indicators (lock) in the access inhibition state in the tables of the server associated with N cards, progressively at the beginning of the preprocessing for each card, in order to inhibit access to each of the N cards by all of the single-unit modules and the other campaign modules, i.e. from the beginning of the first elementary preprocessing until the end of the last post-processing concerning the operation during the campaign.

The campaign module performs the campaign as shown in FIG. 1.

At the beginning of the campaign, the campaign module successively transmits prepared messages of formatted data to the first cards C1, C2, C3, etc., targeted by the campaign and proceeds as of reception of the acknowledgement of each of the data messages thus transmitted, with the analysis of the acknowledgement. As an acknowledgement implicitly indicates that the mobile terminal of the user is in a state of receiving and processing a previously transmitted data message, the campaign module transmits one other prepared message of formatted data after the post-processing POST of an acknowledgement which has just been transmitted by the card of the user. A succession of two sets each one with three elementary processings is indicated in relation to cards C1 and C3 in FIG. 1.

Any single-unit module or campaign module requesting access to one Cn of the cards targeted by the campaign during the campaign reads the state of the access indicator associated with the card Cn in the database in order to inhibit access to the card Cn until the end of the campaign and to monitor a change of state of the access indicator that must occur at the end of the campaign.

The campaign is finished when all of the expected acknowledgements of data messages transmitted have been processed. However, some of the acknowledgements will never be transmitted by user cards when the mobile terminals including the latter are not connected to the radio communication network during the campaign, or when in particular the short message service centre and/or the radio communication network has lost one or more formatted data messages intended for a smart card. The last block in FIG. 1 is associated with a last card Cd which may be any card targeted by the campaign, in principle different from the card CN.

At the end of the campaign, the campaign module releases (unlocks) card by card the smart cards C1 to CN targeted by the campaign by placing the access indicators associated with said cards in the access authorisation state. All of the following single-unit modules and campaign modules, which have requested an operation in the card Cn during the previous campaign, note the access release of the card Cn in order to access each one in turn the card Cn, the first module having applied an access request to the database having priority and so on.

It would seem that the campaign mode has a much greater technical complexity than that of the single-unit mode because the campaign mode consists of repeating the single-unit operations for a very large number of cards, whilst respecting constraints of short messages rate and of campaign duration as well as of monitoring of the campaign progress.

In particular, the access inhibition and access authorisation process described above at the beginning and at the end of a campaign imposes to the campaign module and therefore to the OTA server marking of the "images" of all of the cards concerned by the campaign by an access inhibition state of the access indicators associated with the cards. Said marking is very costly in machine time in the server all the more that the number N of cards may reach a plurality of millions.

Furthermore said marking inhibits access to each card concerned Cn by the campaign during the entire campaign and particularly during all of the single-unit operations represented by the blocks with three elementary processings associated with the card Cn in FIG. 1. Each elementary preprocessing PRET associated with the card Cn could be temporarily interrupted for an operation performed by a single-unit module without hardly altering the campaign the duration of which is very often long, in the order of a few days to a few weeks.

The aim of the invention is to solve the systematic marking of the "images" of all of the cards concerned by a campaign in the database connected to the server and more specifically to reduce the number of markings concerning the cards concerned by the campaign in order to release the server for other tasks and to minimise the blockage time caused by the card campaign.

Said objective is based on the findings that the number of access requests formulated during the campaign by the single-unit modules either at the request of the operator who manages the cards, or at the request of the users owning the cards is statistically very low as opposed to the very high number of cards targeted by the campaign.

For achieving said objective, a method for inhibiting single-unit operations of the downloading of data from a server in portable communicating objects via a radio communication network during a campaign of common operations of the downloading of data from the server in communicating objects, the downloading of data concerning a communicating object including a preprocessing of data in the server in at least one data message intended for the communicating object, a transmission of the data message from the server to the communicating object and a reception by the server of an acknowledgement transmitted by the communicating object, and a post-processing of data in the server in dependency on the acknowledgement, is characterised in that said access to a communicating object targeted by the campaign is authorised for a single-unit operation while the server manages the preprocessing of data for the communicating object during the campaign, and is inhibited for a single-unit operation concerning a communicating object targeted by the campaign as soon as access is requested when the server manages during the campaign transmission of the data message to the communicating object, the reception of acknowledgement transmitted by the communicating object and the post-processing of data concerning the communicating object.

The single-unit operations inhibited according to the method of the invention means any single-unit operation, including any set of single-unit operations constituting a campaign, competing with said campaign.

With the aid of the invention, the server is released for other tasks in dependency on the difference between the number of cards targeted by the campaign and the number of cards for each one of which at least one access request has been formulated by a single-unit module, or fairly unlikely by a campaign module, during the campaign. The campaign duration is thus reduced.

According to one other characteristic of the method of the invention, when the preprocessing of data for the communicating object comprises formatting data into messages, the data is reformatted after access to the communicating object targeted by the campaign has been requested for a single-unit operation and the single-unit operation has been executed during or after formatting of all of the messages intended for the communicating object during the preprocessing of data of the campaign.

The invention further aims to solve the organisation of the elementary processings in the downloading server according to prior art during a campaign.

Indeed, the duration of a campaign according to the prior art illustrated in FIG. 1 depends on the number of formatted data messages and therefore on the number of short messages to be transmitted and on the number of smart cards targeted during the campaign. The duration of the campaign offered via a communication gateway, such as a short message service centre, thus depends on the duration of the three successive elementary processings PRET, E/R and POST as well as on the linking of the blocks with three elementary processings shown in FIG. 1 for the downloading in each card.

The downloads have the disadvantage of requiring a long campaign duration because it depends on a plurality of successive sets with three elementary processings for each card targeted. In said conditions, the short message service centre is busy for a very long time and is rarely available for transmitting and receiving the short messages exchanged between the users and the short messages for other campaigns.

Furthermore, the downloading server must manage at the same time a plurality of types of processings which slows down the execution speed and consequently increases the duration of the campaign. For a predetermined short messages rate offered by the short message service centre to the downloading server, and at equal execution performances of the servers, the downloading server will not be able to obtain said rate due to the correlation of the intermediate transmission/reception processing E/R with the preprocessing PRE and the post-processing POST for each data message during the campaign.

The duration of a downloading campaign being very long, an operator always tries to reduce the duration during which a card is "locked" during the campaign in order not to inhibit for too long access to the card for the single-unit operations launched in particular by the user of the card. Consequently, the number of campaigns and their durations are fundamental elements imposed on the operation of the OTA downloading server.

To free oneself of the above-mentioned disadvantages, the invention proposes to load a larger number of cards for a given campaign duration and to use the downloading server more efficiently for the various elementary processings. To said end, the method of the invention is characterised in that the preprocessings of data and post-processings of data concerning communicating objects are respectively executed before and after the transmissions of the message and the receptions of acknowledgement concerning communicating objects, and the server only communicates with the radio communication network during the transmissions of the data message and the receptions of acknowledgement.

In other words, the server does not communicate with the radio communication network during the preprocessing of data and post-processing of data concerning communicating objects.

In practice the data messages and the acknowledgements may be respectively transmitted and received by the server via a communication gateway, such as for example a short message service centre, during at least one predetermined time range and with a maximum rate depending on the operation of the communication gateway.

According to the invention, all of the elementary preprocessings of data are executed during a preprocessing phase without the server communicating with the radio communication network. With the aid of the gathering of preprocessings, the server uses to the best of its resources because it is requested to execute the same type of elementary processing. The same applies in relation to the post-processings of data which are executed together during a post-processing phase during which the server does not communicate with the radio communication network. During the post-processing, the database included in the server and used for recording in particular updated images of the contents of communicating objects, such as smart cards, has its resources managed much better than when the server had to execute post-processings and preprocessings simultaneously with the transmissions/receptions of data.

Advantageously, said technological break in relation to prior art allows the resources of the server to be entirely dedicated to the transmission and reception of data when the server communicates with the radio communication network for example via a communication gateway such as a short message service centre. The time ranges imposed by the operation of the communication gateway are only occupied by the communication in the server, i.e. by the transmission of formatted data messages and the reception of acknowledgements. For a given time range, the number of data messages transmitted according to the downloading method of the invention is much higher, and the speed of operation of the server is thus better suited to the rate offered by the short message service centre during each time range. Conversely, for a given number of data messages, the resources requested by the server are reduced by the downloading method of the invention. Consequently with equal campaign duration and equal resources of the server, the invention downloads more cards than according to prior art. The operator of the radio communication network further reduces the time spent monitoring the progress of the campaign.

The prior preparation of data during the preprocessing phase offers the possibility of optimising the preprocessing of data. According to one advantageous characteristic of the invention, the preprocessing of data concerning communicating objects having at least one common characteristics have a common part executed once before the transmissions of the data message and the receptions of acknowledgement. Said characteristic optimises the use of the resources of the server and consequently the duration of the preprocessings of data.

With the same concern for optimising the resources of the server, the duration of the post-processing phase may be reduced with the aid of finding common characteristics of the communicating objects. In said case, the post-processings of data concerning communicating objects having at least one common characteristic have one common part executed once after the transmissions of the data message and the receptions of acknowledgement.

Thus, the decorrelation of the three elementary processings according to the invention and consequently the gathering of the three types of elementary processings in three separate phases, as well as the factorisation of some of the operations by batches of cards during the preprocessing and post-processing phases optimise the processing speed of the server and favour an increase of the rate of the data to be transmitted during a campaign of predetermined duration. Inversely, for a given campaign duration, the resources requested to the server according to the invention are less than those requested according to prior art.

The present invention also concerns a server including at least one single-unit module and a campaign module for inhibiting single-unit operations of the downloading of data requested by the single-unit module in portable communicating objects via a radio communication network during a campaign managed by the campaign module and concerning common operations of the downloading of data in the communicating objects. The server is characterised in that said single-unit module is authorised to access a communicating object targeted by the campaign for a single-unit operation while the campaign module manages the preprocessing of data for the communicating object during the campaign, and is inhibited access for a single-unit operation concerning a communicating object targeted by the campaign when it requests access when the campaign module manages during the campaign transmission of the data message to the communicating object, the reception of acknowledgement transmitted by the communicating object and the post-processing of data concerning the communicating object.

According to one characteristic of the server, the campaign module places an access indicator associated with a communicating object in a first state when a database connected to the server detects an access request established by the single-unit module for accessing the communicating object between the beginning of the transmission of any data message during the campaign to the communicating object and the end of the post-processing of data during the campaign in dependency on the acknowledgement received transmitted by the communicating object in response to the data message, the campaign module places the access indicator associated with the communicating object in a second state at the end of said post-processing of data of the campaign for said communicating object, and the single-unit module requesting access to the communicating object is only authorised to access the communicating object during the preprocessing of data during the campaign after that the database has read the access indicator associated with the communicating object in the second state.

The performances of the database connected to the server are increased due to the reduction of the number of requests for changing the access indicators to the access inhibition state during the campaign. Said reduction of the number of requests of changing the access indicator state is connected to the fact that the access indicator state change for each card only occurs following a first access request formulated by a module during the campaign and not systematically at the beginning of the campaign.

The time during which a card is inhibited access in particular for single-unit modules during the campaign is thus significantly reduced which makes the server more available for operations other than those performed during the campaign.

In order to solve the temporal organisation by blocks with three elementary processings in the downloading server according to prior art during a campaign, the campaign module includes a preprocessing module for preprocessing data into data messages respectively intended for communicating objects while the server does not communicate with the radio communication network, a transmission-reception module for transmitting the data messages to the communicating objects and receiving acknowledgements transmitted by the communicating objects via the radio communication network in response to the data messages, and a post-processing module for post-processing data in the server according to acknowledgements received while the server does not communicate with the radio communication network.

The invention further concerns a computer program on an information medium, comprising program instructions suitable for using the method of the invention for inhibiting single-unit operations of the downloading of data from a server in portable communicating objects via a radio communication network during a campaign of common operations of the downloading of data from the server in the communicating objects, when the program is loaded and executed in the server. According to the invention, the program includes instructions authorising access to a communicating object targeted by the campaign for a single-unit operation while campaign instructions execute the preprocessing of data for the communicating object during the campaign, and instructions inhibiting access to a communicating object targeted by the campaign for a single-unit operation as soon as access is requested when the campaign instructions execute during the campaign transmission of the data message to the communicating object, the reception of acknowledgement transmitted by the communicating object and the post-processing of data concerning the communicating object.

In the aim again of solving the organisation of elementary processings in the downloading server according to prior art during a campaign, the computer program can understand preprocessing instructions for preprocessing data into formatted data messages respectively intended for communicating objects while the server does not communicate with the radio communication network, transmission-reception instructions for transmitting data messages to the communicating objects and receiving acknowledgements transmitted by the communicating objects via the radio communication network in response to the data messages, and post-processing instructions for post-processing data in the server according to acknowledgements received while the server does not communicate with the radio communication network.

Other characteristics and advantages of the present invention will appear more clearly by reading the following description of the plurality of preferred embodiments of the invention, given by way of non-limitive examples, referring to the corresponding drawings appended wherein.

Figure 2:
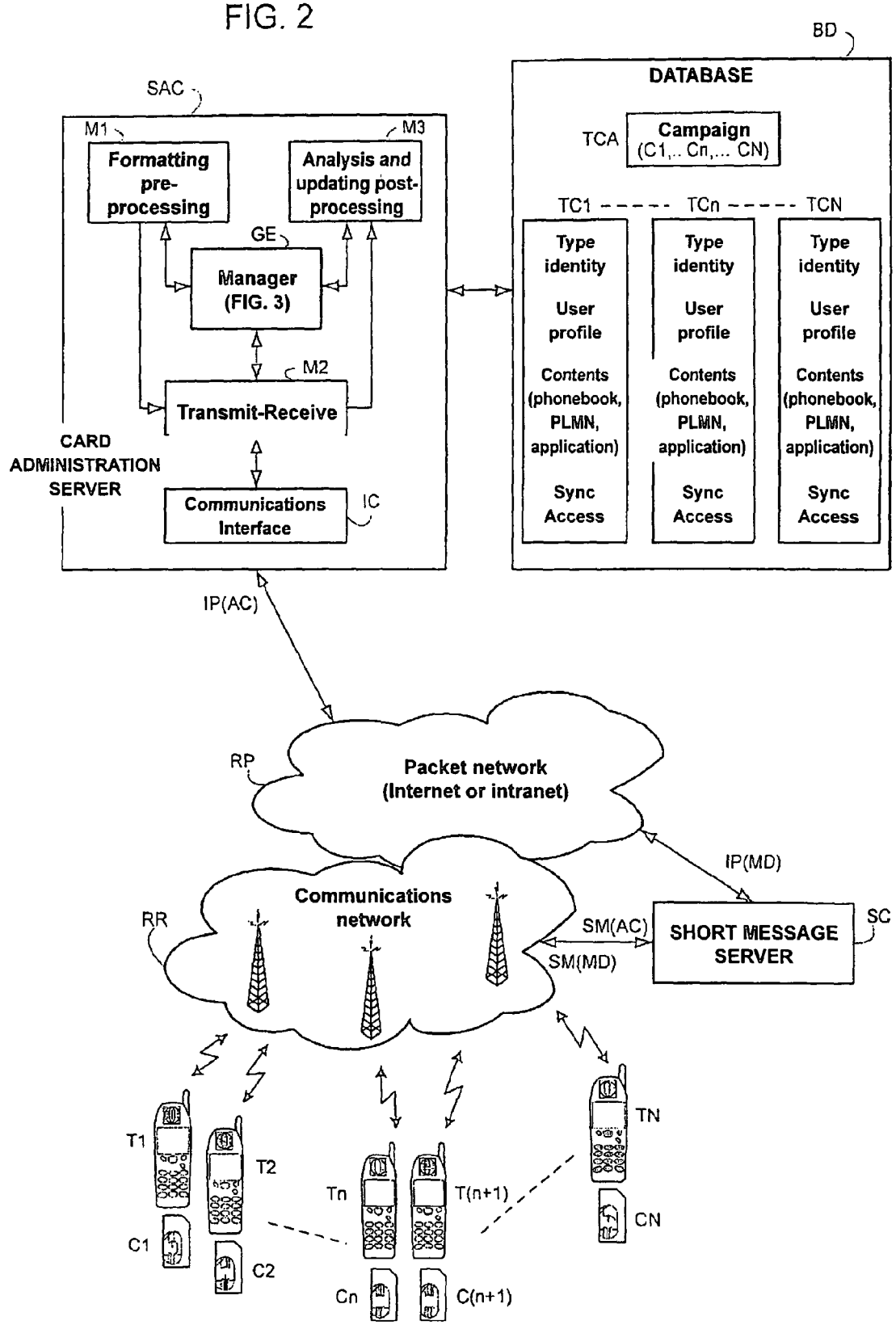
FIG. 2 is a schematic block diagram of telecommunication means connecting the mobile terminals including smart cards of an operator and a card administration server managed by the operator, for using the method of inhibiting single-unit operations according to the invention.

In FIG. 2 are shown the main means for downloading data in the removable user smart cards C1 to CN which equip respectively mobile radio terminals T1 to TN attached to a digital cellular radio communication network RR. The smart card Cn in the mobile terminal Tn, with the index n such as $1 \leq n \leq N$, is of the UICC (Universal Integrated Circuit (s) Card) type. The smart card is for example a SIM (Subscriber Identity Module) card when the network RR is of the GSM type, or an USIM identity module when the network RR is with multiple accesses with distribution by CDMA (Coded Division Multiple Access) codes of the third generation (3GPP) of the UMTS (Universal Mobile Telecommunications System) type.

A card administration server SAC according to the invention is managed by the operator of the network RR and constitutes an OTA (Over The Air) platform. According to the embodiment illustrated in FIG. 2 to which will be referred to hereafter, the server SAC transmits formatted data messages MD to the mobile terminals T1 to TN and receives acknowledgement messages AC transmitted by the mobile terminals T1 to TN, via a communication gateway such as a Short Message Service Centre SC. The service centre SC comprises an access gateway for communicating with the server SAC via a high-speed packet network RP, such as the internet, or such as an intranet network specific to the operator of the network RR. One other access gateway of the short message service centre SC communicates with at least one switch of the mobile service, more often via an access network such as a packet network of X.25 type or an RNIS or ATM network. The data messages MD are transported in IP (Internet Protocol) packets by the server SAC and are formatted in the service centre SC into short messages SM transmitted to the mobile terminals; inversely, acknowledgement messages AC are transmitted in short messages SM by a mobile terminal Tn to the server SAC and are routed by the service centre SC in the form of IP packets to the server SAC.

Alternatively, the short message service centre SC is directly connected or is incorporated to a switch of the mobile service in the network RR.

The invention is not limited to short messages SM as vectors supporting the data to be transmitted. The service centre SC may be an MMS (Multimedia Messaging Service) messaging service centre for the files and the multimedia applications to be downloaded from the server SAC.

According to one other embodiment, the short message service centre is replaced with an access network of the switching network by packets type with management of the mobility and access by GPRS (General Packet Radio Service) radio channel, if the radio communication network RR is of the GSM type. A SGSN (Serving GPRS Support Node) service node of the GPRS network is connected to at least one base station controller of the network RR. A GGSN (Gateway GPRS Support Node) node-gateway of the GPRS network is connected to the packet network RP serving the server SAC.

Alternatively, if the radio communication network RR is of the UMTS type, or of the GSM type supported by a GPRS network, the MD and AC messages are exchanged between a mobile terminal Tn and the associated card Cn according to the BIP (Bearer Independent Protocol) protocol or the J2ME (Java 2 Mobile Edition) protocol.

As shown in FIG. 2, the card administration server SAC is connected to a database BD including various parameters and characteristics of the cards managed by the operator of the radio communication network RR.

The database conventionally contains a controller CR which controls, validates and executes the requests applied by the server SAC and establishes the responses to said requests in order to apply them to the server SAC. In particular, the controller CR manages access requests RQA for using the method of the invention, as we will see hereafter referring to FIG. 3.

The invention thus concerns not only a method used in a server such as the administration server SAC and the database BD for inhibiting single-unit operations of the downloading of data in portable communicating objects such as smart cards or mobile terminals, but also an implementation of stages of the method predetermined by the instructions of a program for inhibiting single-unit operations incorporated in the server SAC-BD. The method according to the invention is therefore used when said program is loaded in a computer, such as the server, the operation of which is therefore controlled by execution of the program. The invention thus applies to a computer program recorded on or in any support or means or information storage system, based on any programming language, for example a high-level language such as Java, and compiled in executable codes which are suitable for using the method according to the invention in the computer such as the server SAC-BD.

Each smart card Cn is associated with a table TCn in the database BD. The table TCn includes in particular initial characteristics which are connected to the identity of the card Cn and to the type of card and which are recorded in the database BD when the card is activated. Said initial characteristics are in particular a serial number of the card, the IMSI (International Mobile Subscriber Identity) international identity of the user of the card, and the telephone number of the mobile user MSISDN (Mobile Station ISDN Number). The type of the card Cn is defined in particular by an identifier of the type of processor included in the card, the identifier of the manufacturer of the card, the number of bits per word processed by the processor, the characteristics of the operating system and of the virtual machine implemented in the card, etc.

Other characteristics specific to using the card and in particular the terminal of the user Tn may also be recorded in the table TCn associated with the card Cn during the activation of the card, and may be modified when the card is being used by activating a single-unit operation. Said other characteristics concern in particular the subscription profile of the user of the card Cn, data that may be modified by the user or by the operator managing the card such as a directory of telephone numbers and e-mail addresses, and for example a PPLMN (Preferred Public Land Mobile Network) preferred radio communication network identifier file. Said networks identified in the PPLMN file are managed by operators with which the operator of the network RR to which the card Cn is attached has passed agreements so that the user of the card Cn communicates via said networks when the user is travelling across territories covered by said networks.

The table TCn also contains one or more application identifiers which have been loaded during activation of the smart card Cn and/or have been downloaded subsequent to its activation. For example, an application consists of modifying the preferred network identifier file PPLMN. According to one other example, the application consists of erasing or downloading an application in the card Cn for example for facilitating the management of the directory of telephone numbers in the card Cn by allowing the user, each time that he records a new telephone number in the card, to save his entire directory in a specific server managed by the operator so that the user can retrieve his saved directory when he loses the card Cn or when he changes the card. One other application may be used to modify the parameters in an application already downloaded in the card Cn; for example, the parameters to be modified are an update of reloading rates and of communication units when the user is subscribed to a prepaid account.

The table TCn further comprises parameters specific to the administration of the card Cn. Said administration parameters are in particular an access indicator IAn and a synchronisation word. The access indicator IAn is in a first state "1" indicating that the card Cn is occupied by at least one elementary processing of a single-unit operation predetermined according to the invention and that may be carried out during a campaign, and in a second state "0" indicating that the card Cn is available for at least one elementary processing. The synchronisation word, such as a date, is produced by a synchronisation generator, known as a synchronisation counter, transmitted in a formatted data message MD by the server SAC for the card Cn.

The database BD also contains one or a plurality of campaign tables TCA respectively allocated to the campaigns. Each campaign table includes a list of MSISDN telephone numbers and the addresses of the tables associated with the cards targeted by the campaign which will be presumed to be the N cards C1 to CN hereafter.

The database BD may be incorporated into the card administration server SAC, or be separate in the form of a database management server which is connected to the server SAC by a packet network such as the network RP, i.e. via the internet or via an intranet network specific to the operator of the network RR.

As shown in detail in FIG. 2, the card administration server SAC includes in relation to the invention a plurality of single-unit data downloading software modules MU, at least one campaign software module MC, and a communication interface IC.

A single-unit module MU only processes at the same time, such as according to prior art, one single-unit operation comprising three elementary processings for downloading via a short message predetermined data in a user smart card Cn. When the operator who manages the smart cards C1 to CN requests the single-unit operation to the single-unit module MU via a workstation connected to the server SAC, or when the user of the card Cn requests the single-unit operation to the single-unit module MU via the keyboard of the terminal Tn and a short message, the single-unit module MU establishes an access request RQA and applies it to the controller CR in the database BD.

For a campaign requested by the operator managing the cards C1 to CN, in particular the MSISDN telephone numbers of the smart cards in conjunction with the addresses of tables TC1 to TCN, the data to be downloaded in the cards and the time ranges of the campaign are provided beforehand by the operator and recorded in a campaign table TCA comprising the address of an available campaign module MC. The campaign module MC processes similar single-unit operations respectively for the smart cards C1 to CN targeted by the campaign.

Figure 3:
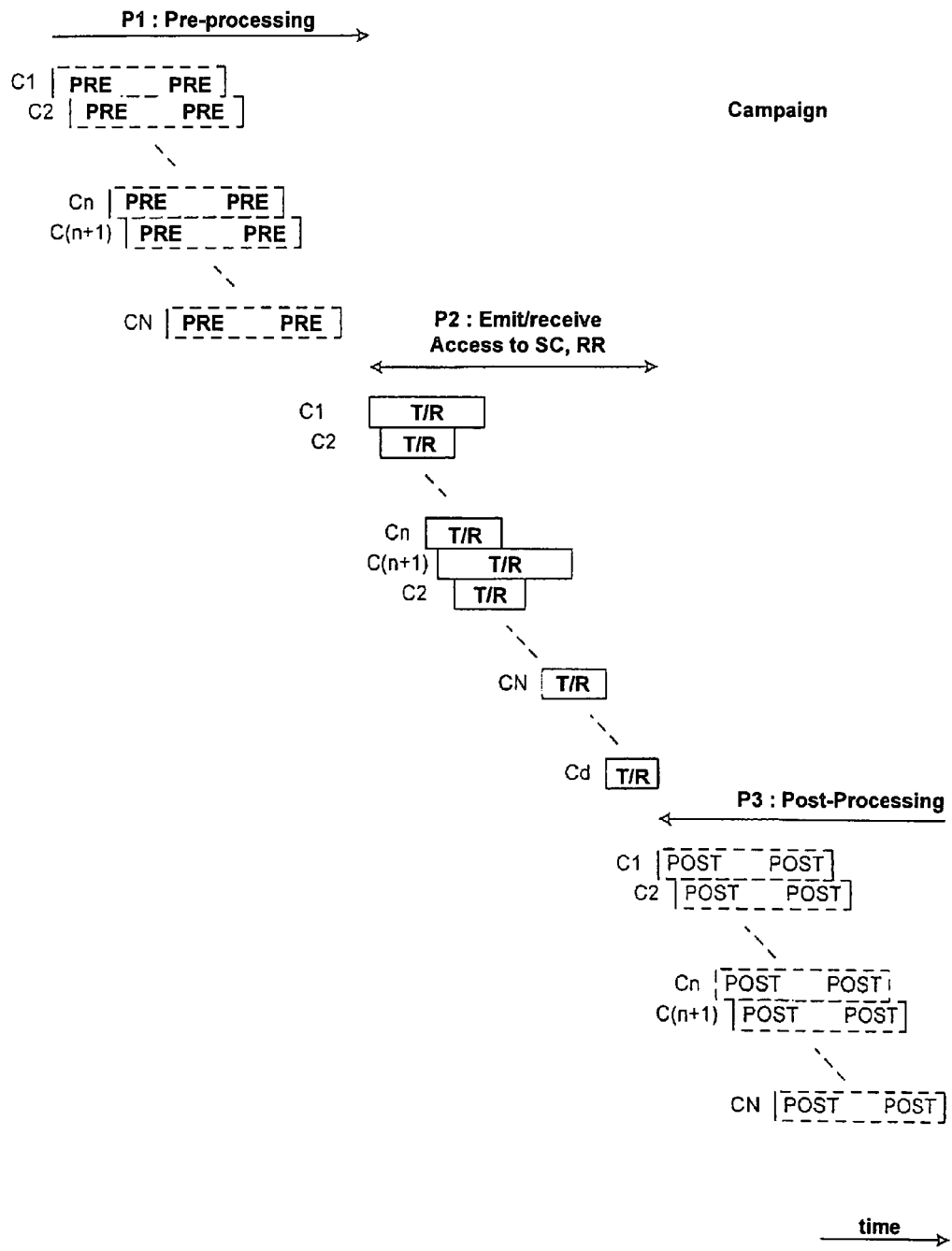
FIG. 3 is a temporal diagram of the main stages of a downloading of data according to the invention.

As also shown in detail in FIG. 2, the campaign module MC includes three software modules M1, M2 and M3 for executing respectively three main phases P1, P2 and P3 of the downloading of data according to the invention, under the operational control of a management module GE which manages the various operations during the downloading, according to the temporal diagram shown in FIG. 3 and described hereafter. Likewise, each single-unit module MU includes three software modules similar to those M1, M2 and M3 in the campaign module MC for executing respectively the elementary processings PRET, E/R and POST of a single-unit operation for a card and a management module similar to that GE in the campaign module MC for managing successively the three elementary processings.

It is presumed that the campaign to be launched by the operator of the radio communication network RR managing the short message service centre SC provides the latter with a predetermined time range and a predetermined rate of short messages SM in the short message service centre SC. The predetermined time range is for example a daily range between 9 am and 7 pm during five days of the week in order to receive the largest number of acknowledgement messages by the users who are available during said time range, as opposed to a time range during the night, Alternatively, the time range is 24 hours a day during a predetermined period.

As shown in FIG. 3, the campaign is divided into three phases P1, P2 and P3 of which only the intermediate phase P2 known as transmission/reception takes place during the predetermined time range so as only to use the latter for transmitting and receiving messages.

Consequently, according to the invention, the phases P1 and P3, known as preprocessing of data phase and postprocessing of data phase, are respectively executed before and after the transmissions of data messages MD and the receptions of acknowledgement messages AC for all of the smart cards C1 to CN to which messages must be transmitted during the predetermined time range. The card administration server SAC therefore does not communicate with the short message service centre SC during the phases P1 and P3 and therefore has no access to the radio communication network RR during the latter.

By way of example, the number N of smart cards to reach during a campaign may be a plurality of one hundred of thousands to a few million. The number of short messages to be transmitted to a card may reach a few tens which corresponds to a plurality of millions or a plurality of tens of millions of short messages to be transmitted during the campaign. The predetermined rate of short messages SM may vary approximately from ten to approximately more than one thousand short messages per second, a short message including at most 140 octets.

In the campaign module MC, the manager GE initialises the campaign by starting by the preprocessing phase P1 and activates the preprocessing module M1. The preprocessing essentially consists of formatting the data to be transmitted in the data messages MD. The state of none of the access indicators IA1 to IAN is modified due to the start of the campaign.

Figure 1:
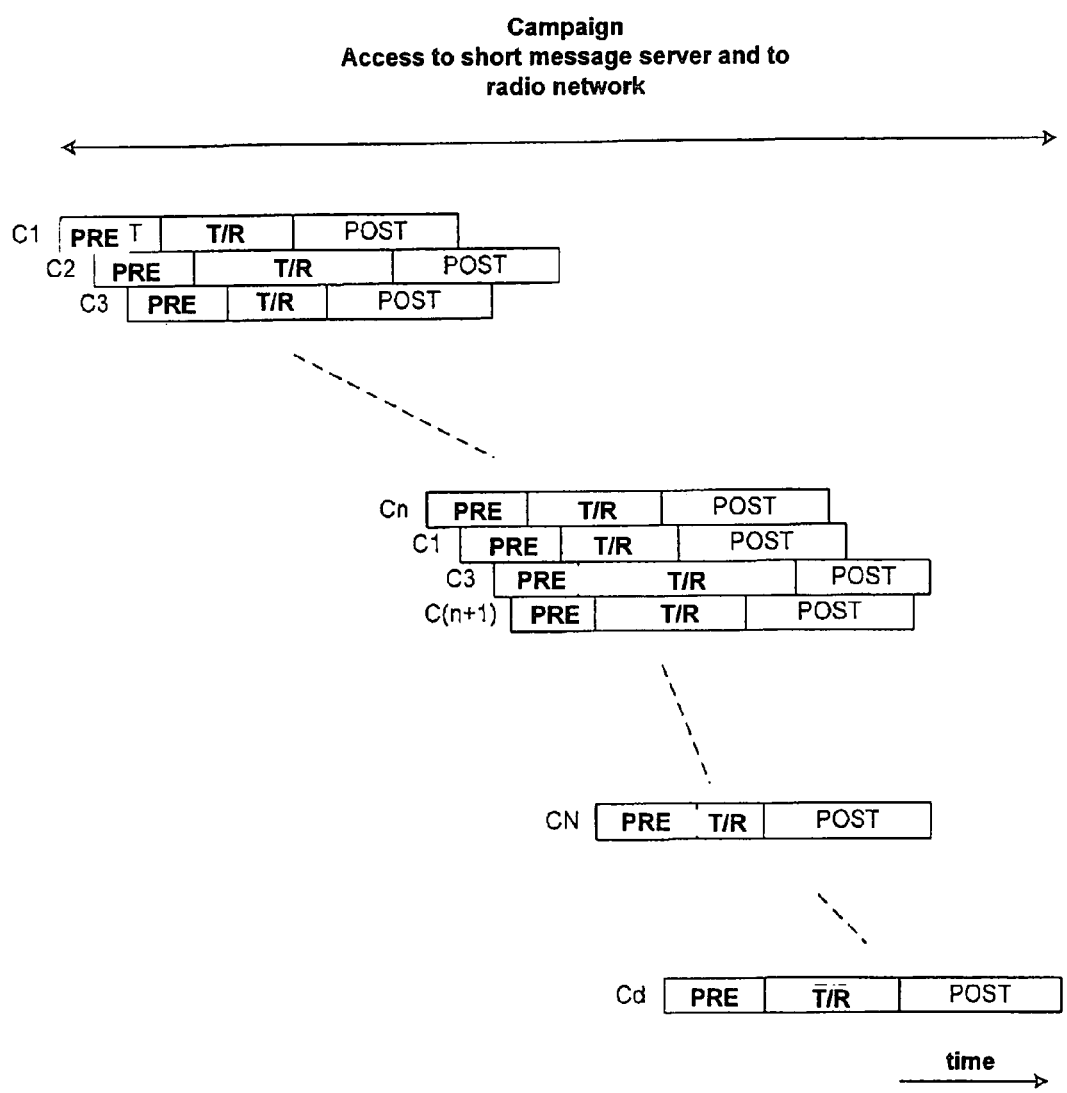
FIG. 1 is a temporal diagram of elementary stages of a method of the downloading of data in the smart cards according to prior art, already discussed.
Figure 4:
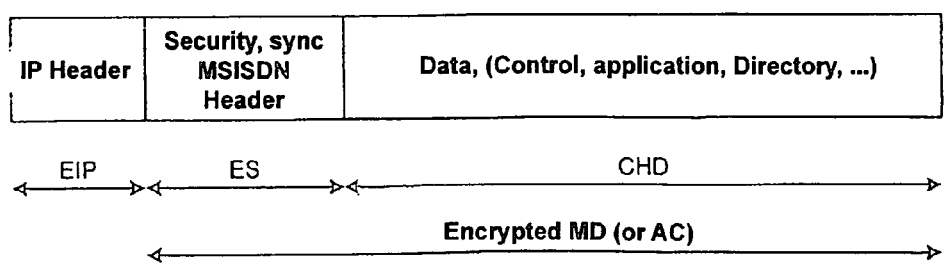
FIG. 4 shows the main fields of a message transmitted or received according to a second embodiment of the invention.

As shown in FIG. 4, a data message MD intended for the smart card Cn consists of two sections: a header ES which is specific to the card Cn and a data field CHD which may be at least partially shared by a plurality of smart cards targeted by the campaign.

The header ES typically comprises a few octets and includes in particular security parameters specific to the card Cn, such as signatures, for example, of authentification and/or encryption elements, the suffix of the MSISDN telephone number corresponding to the card Cn, and a synchronisation word. All of said data is read in the table TCn associated with the card Cn in the database BD for including them in the header ES of the data message.

Following the generation of the header ES, the data to be downloaded in the card Cn, the length of which is variable, is fairly often fragmented into data fields CHD. Each data field CHD has a variable length indicated in the header ES. The data fields include data specific to the campaign, such as the data for updating a directory or a list of preferred radio communication network identifiers, or such as instructions of an application to be downloaded.

The generated header ES and each data field CHD are concatenated into a data message MD to be transmitted which is possibly encrypted according to a key personal to the card Cn. The data message MD is packed in an IP message the EIP header of which contains the address of the server SAC as a source, the address of the service centre SC as a recipient, the length of the IP packet, etc. The module M1 formats the data first for the first card C1, then successively for the cards C2 to CN. The IP packets (MD) thus constructed are stored in a buffer of the server SAC whilst awaiting their transmissions during the following P2 phase.

Certain preprocessings of data PRET concerning cards having at least one common characteristic have preferably one common part executed once during the P1 phase preceding transmissions of the message during the P2 phase. Thus, during the P1 phase, the management module GE sorts the cards C1 to CN targeted by the campaign according to common characteristics that it may read in the tables TC1 to TCN. Said common characteristics may depend in particular on the type of the card, and therefore on the identifier of the manufacturer of the card, of the user type and therefore in particular of the user profile.

For example, when the module M1 must establish a command to be transmitted in the data field CHD of the messages MD, the command is established once for all of the cards originating from the same constructor and having the same processor. Such a preprocessing is validated or invalidated for all of the cards concerned. As opposed to prior art, the grouping of preprocessing or identical preprocessing parts into a common preprocessing advantageously reduces the operating time of the server SAC and thus makes it available for other tasks.

According to one other example, a predetermined formatting of the message is common to all of the messages MD the length of which of the data field is identical and the security characteristics of which introduced in the header and requested for said formatting meet predetermined conditions.

According to yet one other example, when the campaign targets the changing of one part of the content in the cards, the database BD prepares the data to be transmitted for the cards targeted by the campaign according to an identical operation for all of the cards having the same subscription profile; said preprocessing is only executed once for each profile for all of the cards having common profile characteristics in order to reuse the result obtained with the first card for the following cards.

The transmission/reception phase P2 is executed by the module M2 in the campaign module MC via the communication interface IC during the entire time range imposed by the operator managing the short message service centre SC. In FIG. 3, a transmission/reception E/R block extends from the beginning of the transmission of an IP formatted data message (MD) by the server SAC until the end of the reception of an acknowledgement transmitted by the smart card Cn in the server SAC in response to the IP message (MD).

Under the operational control of the manager GE, the transmission/reception module M2 transmits the IP messages (MD) prepared during the preceding preprocessing phase P1 at the short message service centre SC, by starting by transmitting the first messages concerning the first cards, then transmitting in priority the messages concerning the cards for which the acknowledgement messages AC concerning the previously transmitted data messages have been received by the module M2. For example, as shown in FIG. 3, the first messages concerning the cards C1 to C(n+1) are transmitted, then a second message concerning the second card C2 is transmitted following reception of the first acknowledgement message concerning the card C2.

The transmission/reception phase P2 may be finished when an acknowledgement message AC corresponding to the last data message MD prepared during the P1 phase is received, or naturally when the duration of the P2 phase allocated by the operator expires. As indicated in FIG. 3, said last message may concern any card Cd of the campaign targeted. In practice, the duration between the beginning of the transmission E of a data message MD and the end of the reception R of an acknowledgement message AC, illustrated by the length of a block E/R in FIG. 3, is variable according to the availabilities of the RP and RR networks and of the service centre SC passed through by the messages and predominantly according to the state of the mobile terminal containing the smart card for which the data message is intended. Indeed, the mobile terminal may be on standby, or busy, or switched off, or out of network coverage. The duration of an elementary phase E/R is in practice limited, for example to a few tens of minutes, and the module M2 reiterates a plurality of times the transmission of a data message MD, for example two or three times, for which it has not received an acknowledgement message AC. Each time that the module M2 has not received an acknowledgement message in response to a data message, the module M2 restarts the transmission of data messages intended for the card concerned from the first message. After a plurality of attempts to transmit a data message more or less spaced out in time to a card Cn which have failed, the module M2 definitively abandons the transmission of data messages MD for the card concerned Cn.

The IP packets (AC) transmitted by the short message service centre SC are unpacked into possibly encrypted acknowledgement messages AC by the communication interface IC in the campaign module MC. The possibly encrypted acknowledgement messages AC are stored during their reception in a buffer of the server SAC, whilst awaiting post-processing P3 by the module M3. Each acknowledgement message AC has a format similar to the one shown in FIG. 4 and consists of a header ES which is specific to the card associated and concerning the security and the synchronisation, and a data field CHD.

After the reception of the last acknowledgement message AC, or at the latest on expiry of the time range allocated to the server SAC, the transmission/reception phase P2 is considered as finished and is followed by the post-processing phase P3.

During the post-processing phase P3, the post-processing module M3 in the campaign module MC reads in the buffer, possibly decrypts and analyses the acknowledgement messages AC which have been delivered by the smart cards C1 to CN via the mobile terminals T1 to TN and the short message service centre SC in response respectively to the formatted data messages MD. For example, an acknowledgement message AC acknowledges the downloading of data or instructions of an application in the associated card, or acknowledges the execution of a command which has been carried out successfully or which has failed in the associated card.

The module M3 updates and analyses the synchronisation words (Sync) along with the "images" of the contents of cards C1 to CN in the tables TC1 to TCN of the database BD, in response to the acknowledgement messages concerning the cards. The content of the card Cn in the table TCn is updated by the module M3 when all of the data messages concerning said update have been acknowledged by messages AC so that the content in the table TCn reflects the content of the card Cn and is thus the image of said latter.

Similarly to the preprocessing phase P1, the module M3 executes the preprocessing of data POST concerning batches of cards, each batch of cards resulting from a prior sorting of the cards and concerning cards having one or a plurality of common characteristics. Consequently, the post-processing module M3 executes once a common part of the post-processing of data concerning the smart cards having at least one common characteristic. For example, all of the cards having one part of their subscription profiles in common have one part of their content which is updated in their respective tables TC1 to TCN after a common preparation of the updating of the profile during the preprocessing phase P1.

Although the downloading method has been described referring to three completely separated phases P1, P2 and P3 as shown in FIG. 3, the preprocessing and post-processing phases may be mixed. For example, when a plurality of time ranges are arranged for a campaign, the card administration server SAC execute the post-processing phase P3 concerning an analysis of the acknowledgement messages AC received during the immediately preceding phase P2 and executes a preprocessing phase P1 for formatting the data to be transmitted during a following transmission/reception phase P2.

Figure 5:
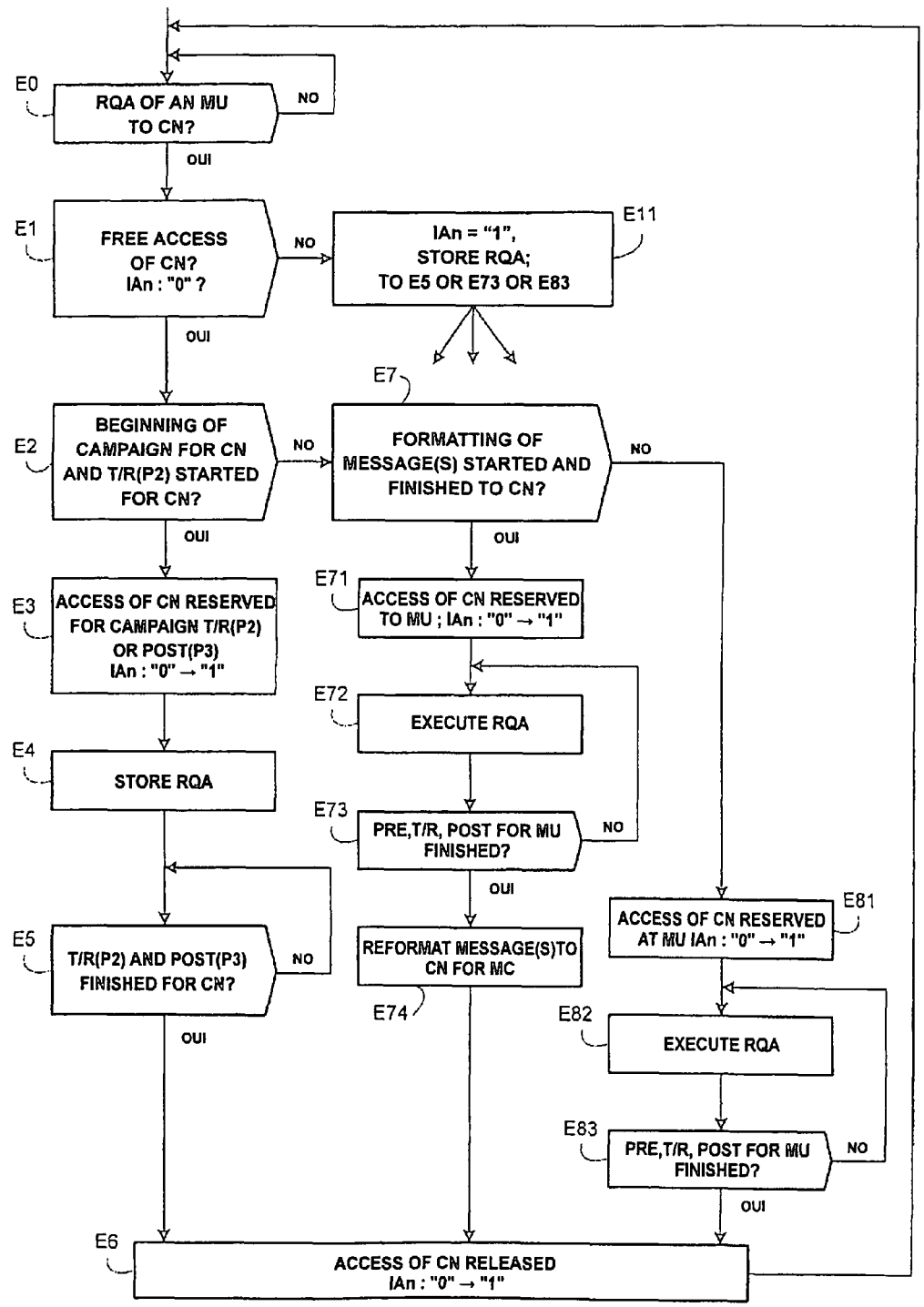
FIG. 5 is an algorithm of stages of the method of inhibiting single-unit operations according to the invention.

Referring to FIG. 5, the method of inhibiting single-unit operations according to the invention includes the stages E0 to E83. It will be noted that the controller CR manages at the same time a plurality of algorithms according to FIG. 5, in relation to the cards C1 to CN targeted by a campaign, in dependency on access requests RQA established during the campaign.

Initially at the E0 stage, it is presumed that a single-unit module MU has established an access request RQA so that it may perform a single-unit operation for a smart card Cn which is likely to be targeted by the campaign.

In response to the request RQA, the controller CR in the database BD reads the access indicator IAn in the corresponding table TCn, at the E1 stage. If the access indicator IAn is in state "0" and therefore if access to the card Cn is free, the controller CR checks at the E2 stage if a campaign exists having already started and targeting the card Cn, by interrogating the campaign tables TCA in the database BD. The controller CR therefore queries the manager GE of the campaign module MC associated with the table TCA concerning the campaign started targeting the card Cn in order to know if the transmissions-reception E/R have started for the card Cn.

If all of the preprocessings concerning the campaign have been executed for the card Cn, the manager GE in the module MC signals it to the controller CR which places in state "1" the access indicator IAn in the table TCn, at the E3 stage. Said state "1" of the access indicator IAn signifies for any other single-unit module or any other campaign module in the server SSC that the card Cn is reserved for the campaign in progress processed by the module MC, such as that is indicated at the E11 stage. Consequently, the access indicator IAn is switched over, according to the invention, to state "1" for the reservation of the card Cn for the campaign when the first module requests access to the card Cn, without said switchover being systematic at the beginning of the campaign. Statistically, the controller CR in the database BD is rarely solicited by access requests RQA, and the E3 stage is only executed for a very low number of cards compared to the very high number N of cards targeted by the campaign.

The single-unit module MU therefore receives from the controller CR a response requesting it to reiterate its access request when the campaign in progress will be finished, as indicated in stages E5 and E6. Preferably, following the request RQA from the single-unit module MU established at the E0 stage, the controller CR stores the address of the module MU in a memory connected to the table TCn, at the E4 stage, so that the controller CR subsequently signals the end of the campaign to the module MU.

Then the campaign module MC continues the campaign by executing a transmission/reception phase P2 and a post-processing phase P3, such as that has been seen referring to FIG. 3. In particular, the modules M2 and M3 in the campaign module MC execute all of the elementary processings concerning the transmissions/receptions E/R and the post-processings POST for the card Cn during said campaign, at the E5 stage.

During the continuation of the campaign during the P2 and P3 phases, one other module, for example, one other single-unit module, may request access to the card Cn by establishing an access request RQA applied from the controller CR for executing one other single-unit operation for the card Cn, such as that indicated at the E11 stage. The controller CR noting that the access indicator IAn in the table TCn is already in state "1" applies to said other module a response requesting it to reiterate its access request when the campaign in progress will be finished, after stages E5 and E6.

As soon as the campaign is finished and particularly when the last post-processing POST concerning the card Cn is finished, which is signalled by the manager GE in the module MC to the controller CR, said latter places in state "0" the access indicator IAn in order to release access to the card Cn for the single-unit operation requested first by the single-unit module MU, as indicated by the return from the E6 stage to the E0 stage. In fact at the end of the campaign, the controller CR places in state "0" the access indicators IA1 to IAN in order to release among the cards C1 to CN targeted by the campaign, the cards for which at least one request RQA has been applied to the controller CR and the access indicator has been changed from "0" to "1" during the campaign.

Returning to the E2 stage, if the post-processings PRET at least for the card Cn have started or are finished without any message having been transmitted to the card Cn and therefore without the preprocessing phase P1 being finished, the controller CR checks at the E7 stage if the formatting of all of the messages intended for the card Cn is finished during the preprocessing phase P1, the formatting of the messages being indivisible.

If the formatting has already started, the request RQA is placed in pending until the end of the formatting by the controller CR. At the end of the formatting in said case, or on reception of the request RQA after the end of the formatting during the P1 phase, the controller CR places in state "1" the access indicator IAn in the table TCn in order to inhibit any access to the card Cn at least during the transmission/reception E/R and the post-processing POST of the single-unit operation executed by the single-unit module MU, at the E71 stage. Then the controller CR authorises the single-unit module MU to execute the single-unit operation intended for the card Cn, at the E72 stage. As indicated at the following E73 stage, when the single-unit module MU signals the end of the execution of the post-processing POST of the single-unit operation to the controller CR, said latter signals it in turn to the campaign module MC so that the module M1 in the latter reformats the data to be transmitted to the card Cn during the preprocessing phase P1 of the campaign in progress, at the E74 stage. Indeed, the post-processing executed by the single-unit module MU at the E73 stage modifies in particular the synchronisation word associated with the card Cn, and consequently the synchronisation words to be included in the data messages to be transmitted to the card Cn during the campaign must be modified accordingly, which imposes a reformatting of the messages.

If at the E7 stage the formatting of the messages intended for the card Cn has not yet started during the preprocessing phase P1 of the campaign, stages E81, E82 and E83 similar to stages E71, E72 and E73 are performed.

Stages E81 to E83 are also performed when the controller CR notes that no campaign targeting the card Cn has started at the E2 stage.

After the E5 stage, or after the E74 or E83 stage, the controller CR converts the access indicator Cn from "1" to "0" and the method returns to the E0 stage in order to release the access of the card Cn for a next module the address of which is the first in the memory connected to the table Cn, or if the memory is empty, for any other single-unit module or campaign module reiterating or not an access request.

When at the E1 stage the access indicator IAn is in state "1" and therefore access to the card Cn is inhibited due to an occupation by a campaign or a single-unit operation in the process of being executed in relation with the card Cn, such as that already mentioned, the controller CR stores the address of the module MU in the memory connected to the table TCn, at the E11 stage, so that the controller CR subsequently signals the end of the campaign or the single-unit operation to the module MU. Access of the card Cn will only be released after the next stage E5, or E74, or E83.

The invention is not limited to a downloading of data in the smart cards of the UICC type. A smart card wherein data is to be downloaded may also be a card included in a laptop computer connected to a mobile terminal, or a payment card or any other additional card included in a mobile terminal.

According to other variants, the invention applies to other portable communicating electronic objects such as communicating personal digital assistants PDA. The invention even applies to mobile terminals targeted by a campaign for which the data to be downloaded may concern a game to be recorded in the non-volatile EEPROM type of memory of mobile terminals.

The invention claimed is:

1. A method for inhibiting single-unit operations of a downloading of data from a server in portable communicating objects via a radio communication network during a campaign of common operations of the downloading of data from the server in the communicating objects,
wherein the downloading of data concerning a communicating object includes a preprocessing of data in the server into at least one data message intended for the communicating object, transmission of the data message from the server to the communicating object and reception by the server of an acknowledgement transmitted by the communicating object, and post-processing of data in the server in dependency on the acknowledgement,
said method including the steps of authorizing access to a communicating object targeted for a single-unit operation while the server manages the preprocessing of data for the communicating object during the campaign, and inhibiting access for a single-unit operation concerning a communicating object targeted by the campaign as soon as access is requested when the server manages, during the campaign, transmission of the data message to the communicating object, the reception of an acknowledgement transmitted by the communicating object and the post-processing of data concerning the communicating object.

2. The method according to claim 1, wherein the preprocessing of data for the communicating object comprises formatting of the data into messages, and wherein the data is reformatted after access to the communicating object targeted by the campaign has been requested for a single-unit operation and the single-unit operation has been executed during or after the formatting of all of the messages intended for the communicating object during the preprocessing of data of the campaign.

3. The method according to claim 1, wherein the preprocessing of data and post-processing of data concerning communicating objects during the campaign are respectively executed before and after the transmissions of the data message and the receptions of acknowledgement concerning communicating objects, and the server only communicates with the radio communication network during the transmissions of the data message and the receptions of acknowledgement, and wherein
any access requested to a communicating object targeted by the campaign is inhibited during the transmissions of the data message and the receptions of acknowledgement and the post-processing of data concerning communicating objects of the campaign.

4. The method according to claim 3, wherein the preprocessing of data concerning communicating objects having at least one common characteristic comprises executing one common part once before the transmissions of the data message and the receptions of acknowledgement.

5. The method according to claim 3, wherein the post-processing of data concerning communicating objects having at least one common characteristic comprises executing one common part executed once before the transmissions of the data message and the receptions of acknowledgement.

6. The method according to claim 1, wherein the data messages and acknowledgements are respectively transmitted and received by the server via a communication gateway during at least one predetermined time range and with a maximum rate depending on the operation of the communication gateway.

7. A server including at least one single-unit module and one campaign module for inhibiting single-unit operations of a downloading of data requested by the single-unit module in portable communicating objects via a radio communication network during a campaign managed by the campaign module and concerning common operations of the downloading of data in the communicating objects,
wherein the downloading of data concerning a communicating object includes a preprocessing of data in the server into at least one data message intended for the communicating object, transmission of the data message from the server to the communicating object and reception by the server of an acknowledgement transmitted by the communicating object, and post-processing of data in the server in dependency on acknowledgement,
wherein said single-unit module is authorised to access a communicating object targeted by the campaign for a single-unit operation while the campaign module manages the preprocessing of data for the communicating object during the campaign, and is inhibited access for a single-unit operation concerning a communicating object targeted by the campaign when said single-unit module requests access while the campaign module manages, during the campaign, transmission of the data message to the communicating object, the reception of an acknowledgement transmitted by the communicating object and the post-processing of data concerning the communicating object.

8. The server according to claim 7, wherein the campaign module places an access indicator associated with a communicating object in a first state when a database connected to a server detects an access request established by the single-unit module for accessing the communicating object between the start of transmission of any data message during the campaign to the communicating object and the end of the post-processing of data during the campaign, in dependency on the acknowledgement received from the communicating object in response to the data message,
the campaign module places the access indicator associated with the communicating object in a second state at the end of said post-processing of data of the campaign for said communicating object, and
the single-unit module requesting access to the communicating object is only authorised to access the communicating object during the preprocessing of data during the campaign after the database has read the access indicator associated with the communicating object in the second state.

9. The server according to claim 7, wherein said campaign module includes a preprocessing module for preprocessing data into data messages respectively intended for communicating objects while the server does not communicate with the radio communication network, a transmission-reception module for transmitting the data messages to the communicating objects and receiving acknowledgements transmitted by the communicating objects via the radio communication network in response to the data messages, and a post-processing module for post-processing data in the server according to acknowledgements received while the server does not communicate with the radio communication network.

10. The server according to claim 7, wherein the communicating objects are removable user smart cards of mobile terminals.

11. The server according to claim 7, wherein the communicating objects are mobile terminals.

12. A non-transitory computer readable medium storing a computer program, the computer program comprising program instructions suitable for inhibiting single-unit operations of a downloading of data from a server in portable communicating objects via a radio communication network during a campaign of common operations of the downloading of data from the server in the communicating objects, when said program is loaded and executed in the server, wherein said program includes instructions authorising access to a communicating object targeted by the campaign for a single-unit operation while the campaign instructions execute the preprocessing of data for the communicating object during the campaign, and instructions inhibiting access to a communicating object targeted by the campaign for a single-unit operation as soon as access is requested when the campaign instructions execute, during the campaign, transmission of the data message to the communicating object, the reception of an acknowledgement transmitted by the communicating object and the post-processing of data concerning the communicating object.

13. The non-transitory computer readable medium according to claim 12, wherein the computer program further includes preprocessing instructions for preprocessing data into data messages respectively intended for communicating objects while the server does not communicate with the radio communication network, transmission-reception instructions for transmitting data messages to the communicating objects and receiving acknowledgements transmitted by the communicating objects via the radio communication network in response to the data messages, and post-processing instructions for post-processing data in the server according to acknowledgements received while the server does not communicate with the radio communication network.

* * * * *